(12) United States Patent
Bleckat et al.

(10) Patent No.: US 12,196,248 B2
(45) Date of Patent: Jan. 14, 2025

(54) CONNECTING DEVICE FOR RELEASABLY CONNECTING TWO FUNCTIONAL GROUPS

(71) Applicant: Fidlock GmbH, Hannover (DE)

(72) Inventors: Björn Bleckat, Hannover (DE); Lasse Hiller, Ronnenberg (DE); Oliver Pankoke, Sarstedt (DE); Breido Botkus, Hannover (DE); Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 311 days.

(21) Appl. No.: 17/441,754

(22) PCT Filed: Oct. 6, 2020

(86) PCT No.: PCT/EP2020/077998
§ 371 (c)(1),
(2) Date: Sep. 22, 2021

(87) PCT Pub. No.: WO2021/259512
PCT Pub. Date: Dec. 30, 2021

(65) Prior Publication Data
US 2022/0307544 A1    Sep. 29, 2022

(30) Foreign Application Priority Data
Jun. 26, 2020    (DE) .............. 10 2020 207 983.8

(51) Int. Cl.
*F16B 47/00*    (2006.01)
*A47G 1/17*    (2006.01)

(52) U.S. Cl.
CPC ............... *F16B 47/00* (2013.01); *A47G 1/17* (2013.01); *F16B 2200/83* (2023.08)

(58) Field of Classification Search
CPC .......... A47G 1/17; F16B 47/00; F16B 47/006
(Continued)

(56) References Cited

U.S. PATENT DOCUMENTS 5,192,043 A    3/1993   Fa
5,516,019 A *  5/1996   Moon ................ B60R 9/058
                                            248/205.8
(Continued)

FOREIGN PATENT DOCUMENTS

BE    890725 A    4/1982
CN    2474034 Y   1/2002
(Continued)

OTHER PUBLICATIONS

Li, "China Mechanical Design Canon", Jiangxi Science & Technology Publishing House, 2002, pp. 1062-1063, vol. 5.

*Primary Examiner* — Alfred J Wujciak
(74) *Attorney, Agent, or Firm* — The Webb Law Firm (57) ABSTRACT

Provided is a connecting device for releasably connecting two functional groups. The connecting device includes a first connecting part which is assigned to a first of the functional groups and configured as an area portion, and a second connecting part which is assigned to a second of the functional groups and has a vacuum element which along a fitting direction is connectable to the area portion of the first connecting part and in a connected position bears on the area portion with a vacuum effect. The first connecting part in the connected position is mounted in relation to the second connecting part so as to be movable along the plane perpendicular to the fitting direction. By moving the first connecting part relative to the second connecting part, the position of the vacuum element relative to the area portion is variable.

17 Claims, 6 Drawing Sheets

(58) Field of Classification Search
USPC .... 248/683, 467, 205.5, 206.5, 309.3, 309.4
See application file for complete search history.

(56) References Cited

U.S. PATENT DOCUMENTS

| | | | |
|---|---|---|---|
| 5,641,105 | A | 6/1997 | Goto |
| 9,709,218 | B1* | 7/2017 | Mchatet ................ G06F 1/1633 |
| 2003/0086748 | A1 | 5/2003 | Culpepper |
| 2007/0257166 | A1 | 11/2007 | Christopherson |
| 2013/0323388 | A1 | 12/2013 | Talsma et al. |
| 2015/0144754 | A1 | 5/2015 | Elharar |
| 2015/0212544 | A1 | 7/2015 | Chen et al. |
| 2016/0229352 | A1* | 8/2016 | Zhang ................ F16M 13/022 |
| 2017/0276290 | A1 | 9/2017 | Fiedler |
| 2018/0131794 | A1 | 5/2018 | Holder |
| 2020/0081489 | A1 | 3/2020 | Stryker et al. |
| 2021/0180642 | A1 | 6/2021 | Botkus et al. |
| 2021/0341011 | A1* | 11/2021 | Brenner ................ F16B 47/00 |
| 2022/0056944 | A1* | 2/2022 | Huang ................ F16B 47/00 |
| 2023/0071906 | A1* | 3/2023 | Polster ................ F16B 47/00 |

FOREIGN PATENT DOCUMENTS

| | | | |
|---|---|---|---|
| CN | 101113751 | A | 1/2008 |
| CN | 216478229 | U | 5/2022 |
| EP | 0689966 | B1 | 11/1998 |
| EP | 1614827 | A1 | 1/2006 |
| JP | S6399506 | A | 4/1988 |
| JP | 2013185697 | A | 9/2013 |
| JP | 2018505998 | A | 3/2018 |
| KR | 1020140134204 | A | 11/2014 |
| WO | 2012163407 | A1 | 12/2012 |
| WO | 2019086648 | A2 | 5/2019 |
| WO | 2020040160 | A1 | 2/2020 |

\* cited by examiner

FIG 6

CONNECTING DEVICE FOR RELEASABLY CONNECTING TWO FUNCTIONAL GROUPS

CROSS-REFERENCE TO RELATED APPLICATIONS

This application is the United States national phase of International Application No. PCT/EP2020/077998 filed Oct. 6, 2020, and claims priority to German Patent Application No. 10 2020 207 983.8 filed Jun. 26, 2020, the disclosures of which are hereby incorporated by reference in their entirety.

BACKGROUND OF THE INVENTION

Field of the Invention

The disclosure relates to a connecting device for releasably connecting two functional groups.

Description of Related Art

A connecting device of this type comprises a first connecting part which is assigned to a first of the functional groups and configures an area portion, and a second connecting part which is assigned to a second of the functional groups and has a vacuum element which along a fitting direction is connectable to the area portion of the first connecting part, in a connected position bears on the area portion and, when stressed by the effect of a vacuum, is held on the area portion.

A connecting device presently should serve in particular for fastening an electronic apparatus to an assigned functional group. The connecting device can thus enable the fastening of a camera to a helmet (for example a skiing helmet or a cycling helmet) or else the fastening of a mobile phone or any other electronic apparatus in or to an assigned functional group, for example on a vehicle, for example on the windshield or on the dashboard of a motor vehicle, or on the handlebar of a bicycle or motorcycle.

When a camera is fastened to a helmet, for example a skiing helmet or a cycling helmet, or a mobile phone is fastened to an assigned functional group, pulsed impact forces which have to be absorbed and dissipated and in particular should not lead to the camera or the mobile phone being released can thus act when in use. Such a connecting device for fastening an electronic apparatus, for example a camera or a mobile phone, is therefore to be particularly capable of absorbing briefly acting, pulsed impact forces.

For fastening completely different functional groups to one another, for example also for fastening an electronic apparatus in the form of a mobile phone or a navigation apparatus in a vehicle, connection devices which provide a mounting by means of vacuum are known. A connecting device which uses a vacuum element in the form of a suction cup so as to establish a mobile phone on the windshield of a vehicle is thus known from US 2013/0323388 A1. To this end, the suction cup is placed onto the windshield, wherein a magnetic element which for improving the adhesion to the windshield can interact with a magnetically acting element on the windshield is disposed on the suction cup.

In a connecting device for fastening an alarm device to a metal surface known from U.S. Pat. No. 5,192,043, a magnetic rubber area is placed onto a metal surface, wherein a vacuum is created when placing said magnetic rubber surface, such that the alarm device is held on the metal surface as a result of the magnetic action between the rubber surface and the metal surface and by vacuum forces.

A connecting device known from EP 0 689 966 B1 has a magnetic contact plate on which a suction cup is disposed. A ski rack can be fastened to a vehicle roof of a vehicle by means of the connecting device.

Such connecting devices should be easy to lock, on the one hand, so as to establish a connection between the assigned functional groups. It is however moreover also desirable that such connection devices are easy to open so as to avoid in particular that said connecting devices are removed with a jerking action while overcoming a vacuum and optionally additionally a magnetic connection. In particular when used in conjunction with an electronic apparatus, it is furthermore desirable here that the connecting device is designed in a space-saving and simple manner while using fewer components.

A connecting device in which a closure module has a vacuum element which can be placed onto an assigned fitting component so as to in a connected position interact with the fitting component by way of a vacuum is known from WO 2019/086648 A2. An adjustment element can be adjusted so as to release a flow opening in order for the closure module to be released from the fitting component.

SUMMARY OF THE INVENTION

It is an object of the proposed solution to make available a connection device which is easy to use, in particular easy to close, but also easy to open again, while advantageously connecting the assigned functional groups, even under the stress of an impact, and using a simple and space-spacing construction.

This object is achieved by a connecting device having features as described herein.

Accordingly, the first connecting part in the connected position is mounted in relation to the second connecting part so as to be movable along the plane perpendicular to the fitting direction wherein, by moving the first connecting part relative to the second connecting part, the position of the vacuum element relative to the area portion is variable and, as a result thereof, the vacuum effect is able to be cancelled in order for the first connecting part and the second connecting part to be released from one another.

The connecting device can be of a simple construction. Moreover, the connecting device can be designed so as to be space-saving. This enables in particular the use of the connecting device for holding an electronic apparatus, for example a camera or a mobile phone. For example, a mobile phone can be fastened to an assigned functional group, for example in a vehicle, without the connecting device substantially contributing toward the installation space, in particular axially along the fitting direction.

In the connecting device a connection between the functional groups to be fastened to one another is established in that the connecting parts are fitted to one another along a fitting direction. A sealed space between the vacuum element of the second connecting part and the area portion of the first connecting part is created when fitting such that the functional groups are held to one another by virtue of a vacuum effect. Such a connection can in particular be load bearing in terms of a shock such that impact forces can be absorbed and dissipated by way of the connecting device.

For example, a camera can be fastened to a helmet, or a mobile phone to an assigned functional group, for example in or on a vehicle, for example to a windshield or to a dashboard of a motor vehicle, or to a handlebar of a bicycle or motorcycle, by means of the connecting device.

In the connected position of the connecting device, the vacuum element and the area portion can bear on one another in a planar manner, for example, such that there is effectively no space between the vacuum element and the area portion. However, when the functional groups are stressed relative to one another, a force can act on the first connecting part relative to the second connecting part, said force acting in the direction of enlarging or achieving a spacing located between the vacuum element and the area portion, this causing a vacuum between the vacuum element and the area portion and thus generating holding forces which hold the vacuum element on the area portion and tend to increase the more intensely the connecting parts are stressed relative to one another. When the connecting parts are fitted to one another and a stressing force acts between the connecting parts, the first connecting part is thus held on the second connecting part by virtue of a vacuum effect.

The opening of the connecting device takes place in that the connecting parts are moved relative to one another. The movement of the connecting parts takes place tangentially to the area portion of the first connecting part, specifically in a plane perpendicular to the fitting direction. The position of the vacuum element relative to the area portion is varied by moving the connecting parts relative to one another, as a result of which the vacuum effect is canceled and the connecting parts can thus be removed from one another.

In the connected position, the connecting parts are mounted on one another in such a manner that the connecting parts are movable relative to one another (only) in a defined manner. Mutual guiding of the connecting parts is thus in particular provided by way of the mounting, wherein the movement of the connecting parts for releasing the connecting device takes place along the plane perpendicular to the fitting direction, for example by mutually rotating or displacing the connecting parts.

Guiding can be provided, for example, by way of a rotating mounting or by way of a linear guide, for example by way of a slotted guide, along a rectilinear or curved path of movement.

The guiding here can also be designed in such a manner that the vacuum element and the area portion are mutually movable along a curved plane, in particular when the area portion, for example as is the case with a helmet, is inherently curved and the vacuum element is accordingly shaped.

In one design embodiment, the vacuum element is configured by a cup element which is elastic at least in portions. The vacuum element thus implements a component in the manner of an elastic suction cup which can be disposed on the area portion of the first connecting part so as to, when elastically deformed, form a vacuum between the vacuum element and the area portion and, as a result thereof, provide holding forces for holding the functional groups to one another.

In one design embodiment, the vacuum element is configured in such a manner that, when moving the first connecting part relative to the second connecting part, the vacuum element by way of at least one portion is sheared off from the area portion. When the connecting parts are moved relative to one another, a relative movement of the vacuum element in relation to the area portion takes place. As a result, the vacuum element by way of at least one portion, in particular a peripheral portion, can be moved out of congruence with the area portion such that air can flow into a space between the vacuum element and the area portion, the vacuum effect between the vacuum element and the area portion thus being cancelled. An effect of force caused by a vacuum between the connection parts is thus cancelled by the vacuum element being sheared off from the area portion so that the connecting parts can be released from one another and the functional groups assigned to the connecting parts can be removed from one another.

In one design embodiment, the area portion has an inconsistency. In a movement of the first connecting part relative to the second connecting part the vacuum element is brought to interact with the inconsistency on the area portion, and the vacuum effect between the vacuum element and the area portion is cancelled as a result. In the connected position, the inconsistency does not interact with the vacuum element so that the inconsistency does not compromise the vacuum between the area portion and the vacuum element. However, the vacuum element is brought to interact with the inconsistency when the connecting parts are moved relative to one another such that air can flow between the vacuum element and the area portion and the vacuum effect is cancelled as a result.

The inconsistency can be molded as a depression on the area portion, for example. When the vacuum element is adjusted in the movement of the connecting parts relative to one another, a peripheral portion of the vacuum element can in particular make its way into the region of the inconsistency so that air by way of the inconsistency can flow between the vacuum element and the area portion. The planar bearing of the vacuum element on the area portion is thus interrupted by the inconsistency so that the vacuum effect is cancelled when the inconsistency interacts with the vacuum element.

Instead of being configured by a depression molded in the area portion, the inconsistency can be configured by a raised portion, for example in the manner of a web or a stud, so that the vacuum element when interacting with the inconsistency is raised in portions from the area portion and air can flow between the vacuum element and the area portion as a result.

In one design embodiment, the first connecting part in the connected position is mounted so as to be rotatable in relation to the second connecting part about a rotation axis that is aligned along the fitting direction. When the connecting parts are fitted to one another and connected to one another they can thus be mutually rotated about the rotation axis so that the vacuum element is adjusted relative to the area portion as a result of the rotation, and the vacuum effect can be cancelled as a result.

Such a rotatable mounting can be formed, for example, by way of a bearing journal on one of the connecting parts and by an assigned bearing opening on the other of the connecting parts. For example, the bearing journal can be molded on the second connecting part, while the first of the connecting parts has an assigned bearing opening in which the bearing journal engages in the connected position of the connecting parts. The connecting parts can thus be mutually moved in a defined manner by way of the rotatable mounting in order for the connecting parts to be released from the connected position.

In one design embodiment, the vacuum element is configured so as not to be rotationally symmetrical in terms of the rotation axis. The vacuum element, when viewed along the plane perpendicular to the fitting direction, is thus not shaped so as to be circular but has a shaping that deviates from a circular shape. For example, the vacuum element can be shaped so as to be polygonal, for example rectangular or square. When adjusting the vacuum element in relation to the area portion, portions of the vacuum element can thus be moved out of congruence with the area portion such that air can flow between the vacuum element and the area portion and the vacuum effect between the vacuum element and the area portion is cancelled as a result.

Additionally or alternatively, the vacuum element can be disposed so as to be eccentric in relation to the rotation axis. By virtue of the eccentric disposal of the vacuum element, a portion of the vacuum element can again be moved out of congruence with the area portion by rotating the vacuum element relative to the area portion such that air can flow between the vacuum element and the area portion and the vacuum effect between the vacuum element and the area portion is cancelled as a result.

In such an eccentric disposal, the vacuum element can also be shaped so as to be a rotationally symmetrical and, when viewed along the plane perpendicular to the fitting direction, can thus have a circular shape. By virtue of the eccentricity in the disposal in relation to the rotation axis, a peripheral portion of the vacuum element can be sheared off from the area portion when the vacuum element is rotated about the rotation axis in relation to the area portion such that the vacuum effect can be cancelled as a result.

In one design embodiment, the first connecting part has at least one first magnetic element and the second connecting part has at least one second magnetic element. The at least one first magnetic element and the at least one second magnetic element in the connected position interact in a magnetically attractive manner such that the connecting parts, in addition to the vacuum effect, are magnetically held to one another by the magnetic effect between the magnetic elements.

The magnetic elements of the first connecting part, on the one hand, and of the second connecting part, on the other hand, when fitting the connecting parts to one another serve for providing a magnetic pull such that the vacuum is established in a magnetically facilitated manner (preferably in a self-acting manner). When fitting the connecting parts, the latter, by virtue of the magnetic interaction, are pulled toward one another in a magnetically attractive manner such that (almost) a vacuum is effected between the vacuum element and the area portion in that the vacuum element, configured as an elastic cup element, for example, is pressed against the area portion of the first connecting part.

The at least one first magnetic element and the at least one second magnetic element can in each case be formed by a permanent magnet or else an assembly of a plurality of permanent magnets, and for closing the connecting device interact with one another in a magnetically attractive manner in that said permanent magnets point toward one another by way of unlike magnetic poles. It is however also conceivable for one magnetic element to be formed by a permanent magnet or an assembly of a plurality of permanent magnets while the other magnetic element is formed by a magnetic armature from a ferromagnetic material.

In one embodiment, when moving the first connecting part and the second connecting part relative to one another for releasing the connecting parts from one another, the at least one first magnetic element of the first connecting part and the at least one second magnetic element of the second magnetic part are adjusted relative to one another. As a result of the adjustment of the magnetic elements relative to one another, magnetic pull between the magnets can be weakened in that the magnetic elements are moved out of mutual congruence.

When like magnetic poles are moved closer to one another while moving the connecting parts relative to one another for opening the connecting device, the mutual separation of the connecting parts can even be magnetically facilitated in that a magnetic repulsive force is caused between the magnetic elements and the connecting parts can thus repel one another.

In one design embodiment, the first connecting part has a plurality of first magnetic elements which are distributed along the plane perpendicular to the fitting direction. The magnetic elements are thus disposed so as to be mutually offset along the area portion of the first connecting part, wherein each one of the first magnetic elements of the first connecting part can be assigned a second magnetic element of the second connecting part, for example. The first magnetic elements and the second magnetic elements, when fitting the connecting parts to one another and also in the connected position of the connecting parts, interact in a magnetically attractive manner such that the connecting parts are magnetically held to one another. The magnetic elements can be moved out of mutual congruence by moving the connecting parts relative to one another such that the magnetic effect between the magnetic elements is at least weakened and the connecting parts can thus be easily released from one another.

In one design embodiment it is conceivable that a plurality of first magnetic elements in the form of permanent magnets are disposed on the first connecting part, for example, while a second magnetic element in the form of a ferromagnetic armature, for example in the form of a ferromagnetic plate, is formed on the second connecting part, for example. The magnetic elements of the first connecting part interact in a magnetically attractive manner with the ferromagnetic magnetic element of the second connecting part so as to in the connected position cause a magnetic retention between the connecting parts and to keep the vacuum element bearing on the area portion.

In one design embodiment, the at least one first magnetic element and/or the at least one second magnetic element, when viewed along the plane perpendicular to the fitting direction, is disposed outside the vacuum element. The first magnetic element and/or the second magnetic element thus act so as to be spatially distal from the vacuum element in order to provide a magnetic pull between the connecting parts in the connected position.

In one design embodiment, the first magnetic element and/or second magnetic element are (in each case) formed by an annular permanent magnet. The first magnetic element and/or second magnetic element thus extend in an annular manner about the fitting direction, wherein the first magnetic element and the second magnetic element when fitting the connecting parts to one another lie opposite one another in a magnetically attractive manner and thus magnetically facilitate the connecting action. As a result of the annular design embodiment, a mutual positioning of the connecting parts when fitting can be facilitated. In particular when the first magnetic element as well as the second magnetic element are in each case formed by an annular permanent magnet, the magnetic elements enable a self-acting mutual positioning of the connecting parts in a plane transverse to the fitting direction so that the connecting parts can be brought to bear on one another in the correct position for connecting the functional groups.

As a result of the configuration of the first magnetic element and/or of the second magnetic element by (in each case) an annular permanent magnet, an advantageous positioning effect results in that a comparatively minor transverse offset between the magnetic elements has the effect of a comparatively large magnetic transverse force between the magnetic elements. Because the congruence in the radial direction takes place across a comparatively small distance (corresponding to the radial thickness of the annular permanent magnets), the variation in terms of force is comparatively large when the magnetic elements are mutually offset in a radial manner, this having the effect that the magnetic elements in the event of an offset, by virtue of the magnetic pull, are positioned in a self-acting manner such that said magnetic elements are mutually congruent in the transverse direction and thus lie opposite one another in a congruent manner.

When the first magnetic element and/or the second magnetic element are/is configured so as to be annular, the first magnetic element and/or the second magnetic element can be closed in an annular manner, or else be open at one or a plurality of locations in terms of the circumference. In the cross section, the first magnetic element and/or the second magnetic element here can be configured so as to be round, in particular circular, or polygonal, for example quadrangular.

In one design embodiment, the connecting device has a locking installation for locking a tangential movement of the first connecting part and the second connecting part relative to one another along the plane perpendicular to the fitting direction. For example, the locking installation is activatable for moving the first connecting part and the second connecting part relative to one another along the plane perpendicular to the fitting direction so as to release the first connecting part and the second connecting part from one another. The locking installation serves for blocking a tangential movement of the connecting parts relative to one another along the plane perpendicular to the fitting direction when the locking installation is situated in a locking position. Any unintentional opening of the connecting device is thus prevented as long as the locking installation blocks any mutual movement of the connecting parts. The locking mechanism can be cancelled by activating the locking installation, for example, so that the connecting parts can be mutually moved along the plane perpendicular to the fitting direction and the vacuum element can thus be adjusted in relation to the area portion so as to cancel the vacuum effect between the vacuum element and the area portion.

Such a locking installation can be formed, for example, by a locking pin on one of the connecting parts, said locking pin in a locking position engaging in an assigned locking opening on the other one of the locking parts and being able to be activated for canceling the locking mechanism.

The locking mechanism can alternatively be formed by a latching element in the manner of a stud or the like, for example, the latter in a locking position engaging in a (positively locking manner) with an assigned latching opening. Unlocking here can take place in that a sufficiently large force is exerted between the connecting parts, for example a force that exceeds a pre-determined critical force and has the effect that the latching element makes its way out of a latching engagement with the latching opening.

The critical force can be adjusted, for example, by way of the attractive force of the magnetic elements that keeps the latching element in engagement with the latching opening. When released, the latching element runs onto a delimitation edge of the latching opening such that the latching element, counter to the magnetic pull, is brought to disengage from the latching opening. The force required to this end is adjusted by the magnetic pull in collaboration with the shaping of the latching element and of the latching opening.

Alternatively however, the critical force can also be adjusted by a mechanical spring element, for example, which is deflected when the locking installation is being released and pre-loads the latching element, for example.

The connecting device is configured for fastening an electronic apparatus to an assigned functional group, for example. The connecting device can serve for fastening a camera to a helmet, for example a skiing helmet or a cycling helmet, for example. In another design embodiment, the connecting device can also serve for fastening a mobile phone or a navigation apparatus, or any other electronic communication or information apparatus, for example in or on a vehicle, for example on a windshield or on a dashboard of a motor vehicle, or on a handlebar of a bicycle or motorcycle.

BRIEF DESCRIPTION OF THE DRAWINGS

The concept on which the solution is based is to be explained in more detail hereunder by means of the exemplary embodiments illustrated in the figures.

DESCRIPTION OF THE INVENTION

Figure 1A:
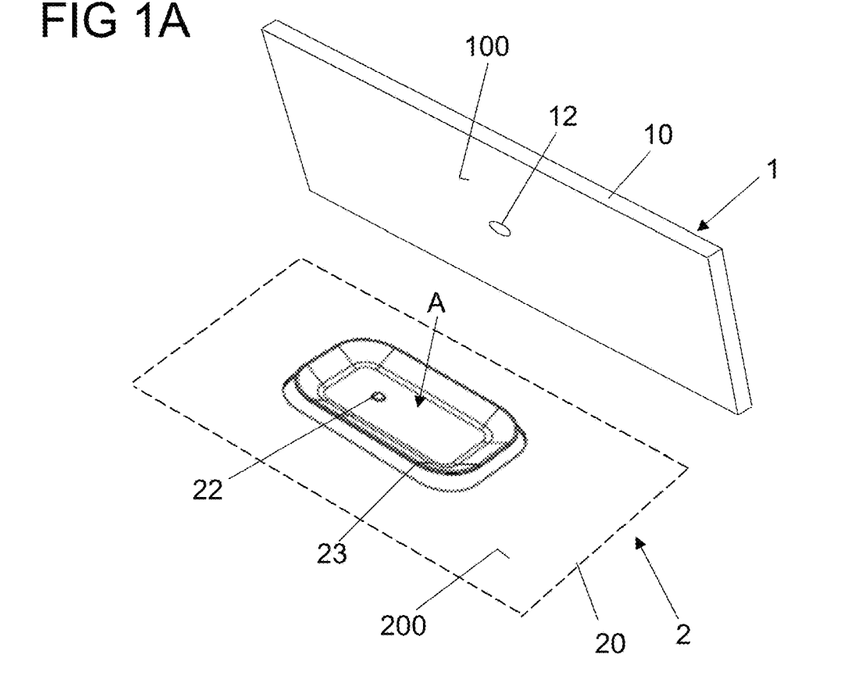
FIG. 1A shows a view of an exemplary embodiment of a connecting device, having a first connecting part and a second connecting part which are able to be fitted to one another along a fitting direction.
Figure 1B:
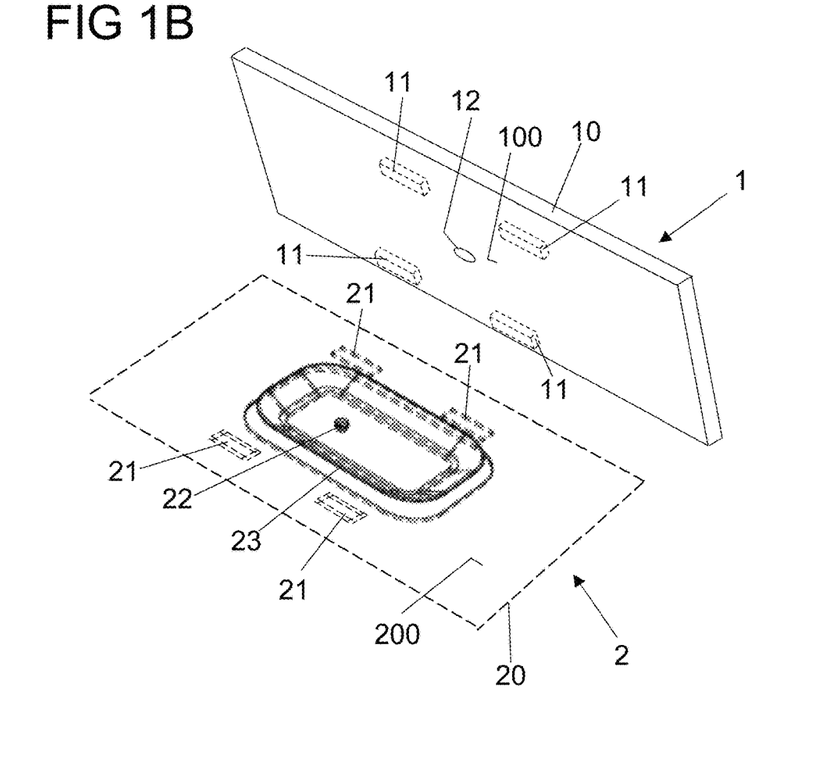
FIG. 1B shows a partially transparent view of the assembly according to FIG. 1A.

FIGS. 1A, 1B show views of an exemplary embodiment of a connecting device which serves for connecting two functional groups 1, 2 to one another. A first functional group 1, for example an electronic apparatus in the form of a mobile phone or the like, here is assigned to a first connecting part 10 of the connecting device, while a second functional group 2 is assigned to a second connecting part 20 of the connecting device.

The first connecting part 10 can be configured as a case element, for example as a mobile phone case, in which the first functional group 1 can be received. The first connecting part 10 configures a first area portion 100 which in the intended use of the connecting device faces the second connecting part 20 and can be fitted to the second connecting wheel 20.

The second connecting part 20 has a member 200 on which a vacuum element 23 is disposed. The vacuum element 23 has the design of an elastic deformable cup element which is molded from an elastic material, for example a silicone material or the like, and is fixedly connected to the member 200.

The connecting parts 10, 20 can be fitted to one another along a fitting direction A in order for the connecting parts 10, 20 to be connected to one another. When fitting, the vacuum element 23 of the connecting part 20 comes to bear on the area portion 100 of the connecting part 10, wherein the vacuum element 23 when fitting is elastically deformed and (almost) a vacuum is created between the vacuum element 23 and the area portion 100.

In a connected position there is thus a vacuum acting between the connecting parts 10, 20, the connecting parts 10, 20 by virtue of said vacuum being held to one another.

In the exemplary embodiment illustrated in FIGS. 1A, 1B, each of the connecting parts 10, 20 has a plurality of magnetic elements 11, 21 which when fitting the connecting parts 10, 20 to one another interact in a magnetically attractive manner such that the connecting parts 10, 20 are magnetically pulled toward one another, the fitting of the vacuum element 23 to the area portion 100 for providing the vacuum effect being thus magnetically facilitated.

In the connected position, the connecting parts 10, 20 are held to one another by a vacuum effect between the vacuum element 23 and the area portion 100, on the one hand, and moreover by a magnetic effect between the magnetic elements 11, 21.

When fitting the connecting parts 10, 20 to one another, a bearing element 22 in the form of a bearing journal on the connecting part 20 comes to engage with a bearing element 12 in the form of a bearing opening on the area portion 100. In the connected position, the connecting parts 10, 20 by way of the bearing elements 12, 22 are mounted so as to be mutually rotatable about a rotation axis directed along the fitting direction A.

As is yet to be explained by means of the exemplary embodiments according to FIGS. 2A, 2B to 5A, 5B, smooth opening of the connecting device can be enabled as a result of the movable mounting of the connecting parts 10, 20 on one another. The connecting parts 10, 20 can thus be mutually rotated for opening the connecting device, as a result of which the vacuum element 23 is adjusted on the area portion 100 and is partially moved out of congruence with the area portion 100 such that air can flow between the vacuum element 23 and the area portion 100, and the vacuum effect between the vacuum element 23 and the area portion 100 is thus canceled.

A firm retention, in particular also in relation to stress by impact, is thus achieved by means of the connecting device in the connected position by virtue of the vacuum effect and the magnetic attraction of the magnetic elements 11, 21. The connecting device moreover enables easy, user-friendly opening by moving the connecting parts 10, 20 relative to one another, wherein the movement of the connecting parts 10, 20 relative to one another leads to the vacuum effect being canceled, on the one hand, and also has the effect that the magnetic elements 11, 21 of the connecting part 10, on the one hand, and of the connecting part 20, on the other hand, are moved out of mutual congruence such that a magnetic pull between the connecting parts 10, 20 is weakened and the connecting parts 10, 20 can thus be easily removed from one another in a substantially force-free manner.

Figure 2A:
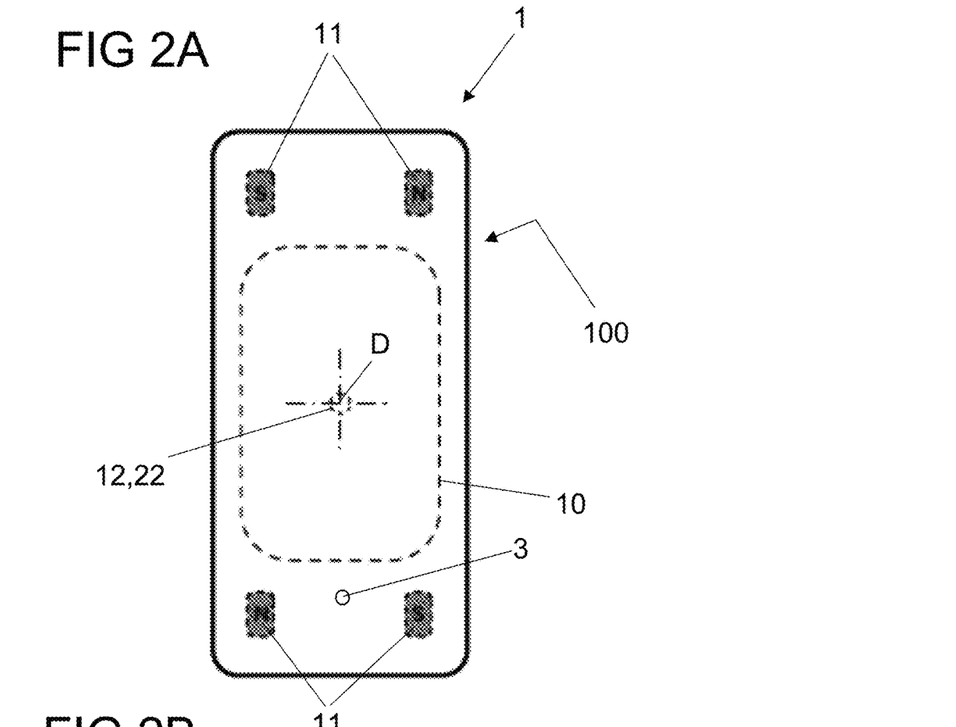
FIG. 2A shows a schematic view of a connecting device in a connected position of two connecting parts.
Figure 2B:
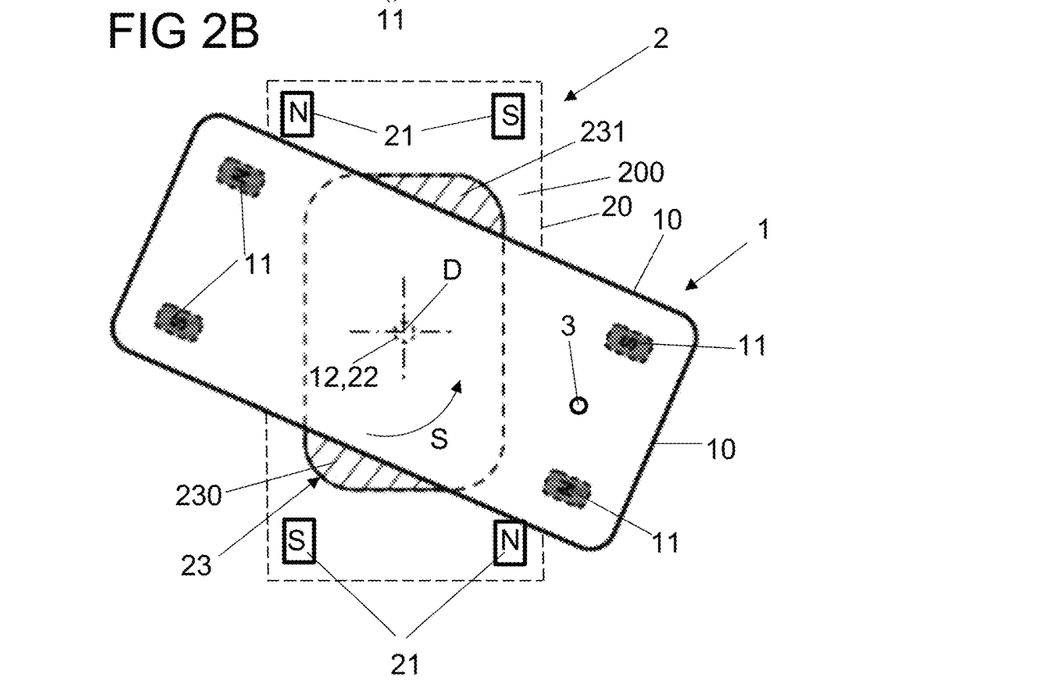
FIG. 2B shows a view of the connecting parts in positions in which the latter are mutually rotated.

The opening procedure of the connecting device is illustrated by means of an exemplary embodiment in FIGS. 2A, 2B, wherein the exemplary embodiment illustrated in FIGS. 2A, 2B in terms of function corresponds to the exemplary embodiment according to FIGS. 1A, 1B.

In the connected position illustrated in FIG. 2A, the vacuum element 23 of the connecting part 20 bears in a planar manner on the area portion 100 of the connecting part 10, wherein (almost) a vacuum is created between the vacuum element 23 and the area portion 100 when stress by loading is applied, and a vacuum thus acts between the connecting parts 10, 20. Moreover, magnetic elements 11, 21 of the connecting parts 10, 20 in pairs are in a magnetically attractive mutual position such that the connecting parts 10, 20 are also magnetically held to one another.

In the exemplary embodiment illustrated in FIGS. 1A, 1B and FIGS. 2A, 2B, the vacuum element 23, in a plane perpendicular to the fitting direction A, has a substantially rectangular shape. The vacuum element 23 is thus configured so as not to be rotationally symmetrical in terms of a rotation axis D defined by the mounting of the bearing elements 12, 22.

When the connecting parts 10, 20 are rotated relative to one another along a pivoting direction S about the rotation axis D, as is illustrated in FIG. 2B, the vacuum element 23 is adjusted on the area portion 100 such that the vacuum element 23 is partially moved out of congruence with the area portion 100. In the rotated position illustrated in FIG. 2B, portions 230, 231 of the vacuum element 23 thus no longer bear in a planar manner on the area portion 100 so that the vacuum element 23 is partially sheared off from the area portion 100 and air can thus flow between the vacuum element 23 and the area portion 100.

In the rotated position illustrated in FIG. 2B, the vacuum effect between the area portion 100 and the vacuum element 23, and thus between the connecting parts 10, 20, is thus canceled. Moreover, the magnetic elements 11, 21 are mutually rotated and thus no longer in a paired mutual position so that the magnetic attraction between the connecting parts 10, 20 is weakened or even reversed to a repulsion.

In the rotated position illustrated in FIG. 2B, the connecting parts 10, 20 can thus be removed from one another without a great effort in terms of force being required to this end.

Figure 3A:
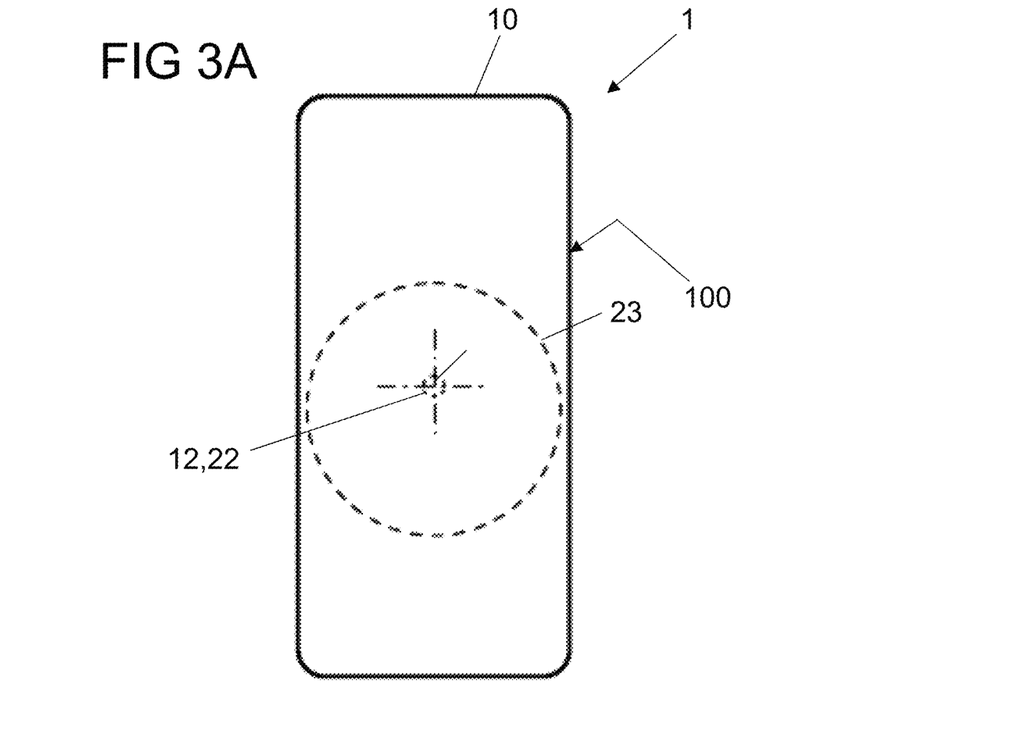
FIG. 3A shows a view of another exemplary embodiment of a connecting device in a connected position of two connecting parts.
Figure 3B:
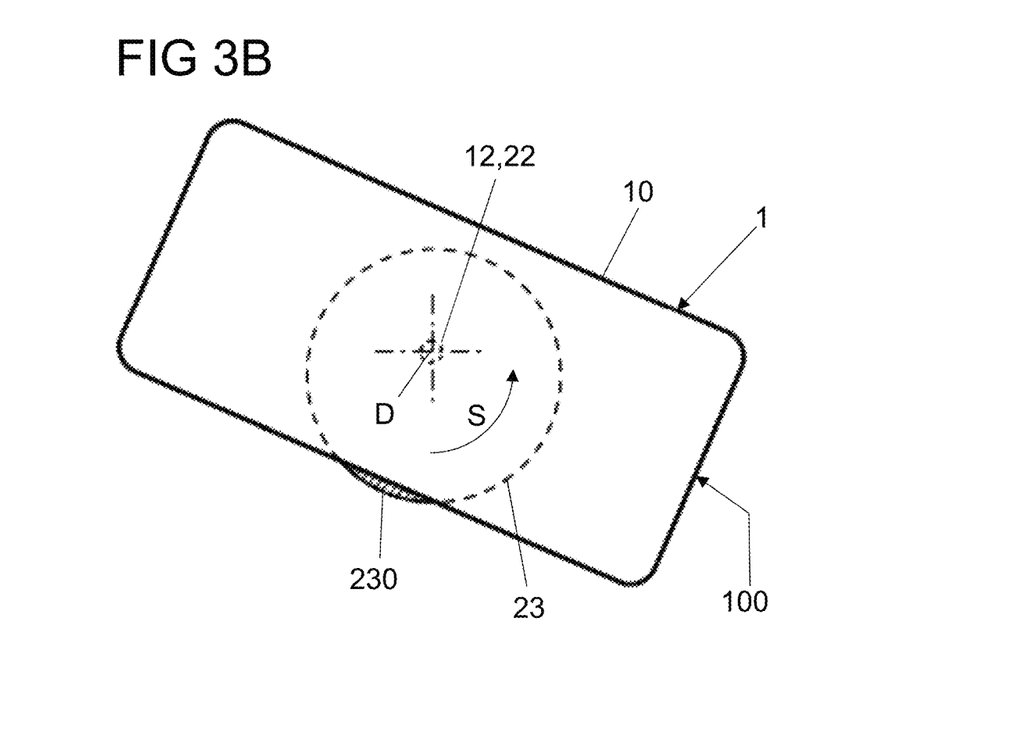
FIG. 3B shows a view of the connecting parts in positions in which the latter are rotated relative to one another.

In an exemplary embodiment illustrated in FIGS. 3A, 3B, the vacuum element 23, when viewed along a plane perpendicular to the fitting direction A, is circular and thus shaped so as to be rotationally symmetrical. The rotation axis D, which is defined by the bearing elements 12, 22, is however disposed so as to be eccentric in relation to the vacuum element 23, this having the effect that, when the connecting parts 10, 20 are rotated relative to one another, the vacuum element 23 by way of a peripheral portion 230 is sheared off from the area portion 100, as can be seen from FIG. 3B.

Figure 4A:
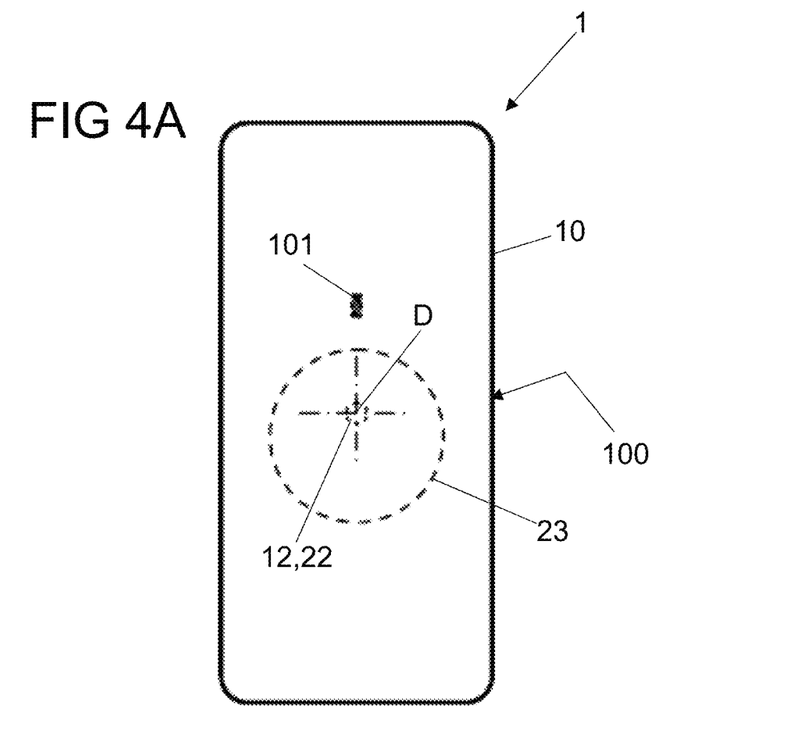
FIG. 4A shows a view of a further exemplary embodiment of a connecting device in a connected position of two connecting parts.
Figure 4B:
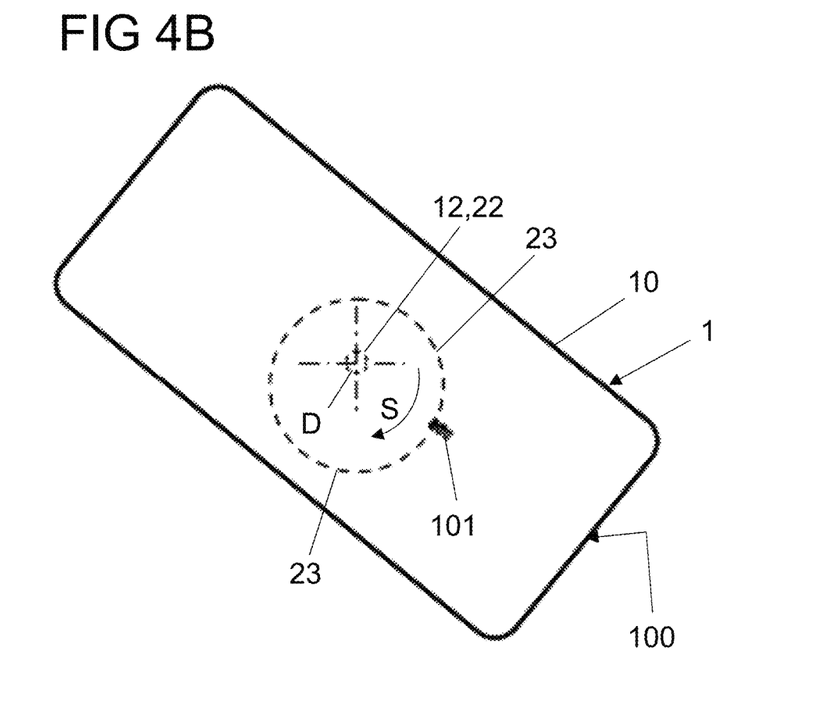
FIG. 4B shows a view of the connecting parts in positions in which the latter are rotated relative to one another.

In an exemplary embodiment illustrated in FIGS. 4A, 4B, the vacuum element 23, in a manner analogous to the exemplary embodiment according to FIGS. 3A, 3B, is shaped so as to be circular and disposed so as to be eccentric in relation to the rotation axis D, wherein the vacuum element 23 is however not sheared off from the area portion 100 when the connecting parts 10, 20 are rotated relative to one another, but by way of a peripheral portion is brought to interact with an inconsistency 101, for example in the form of a depression or an elevation, molded on the area portion 100. As a result of the interaction with the inconsistency 101, a flow path into a space between the area portion 100 and the vacuum element 23 is opened such that air can flow between the vacuum element 23 and the area portion 100, and a vacuum effect between the vacuum element 23 and the area portion 100 is thus canceled.

When the inconsistency 101 is shaped as a depression molded in the area portion 100, a flow path in the manner of a bypass is thus opened by way of the inconsistency 101 in the position according to FIG. 4B.

When the inconsistency 101 is shaped as a depression molded in the area portion 100, a flow path in the manner of a bypass is thus opened by way of the inconsistency 101 in the position according to FIG. 4B.

When the inconsistency 1 is shaped as an elevation, the vacuum element 23 as a result of the interaction with the inconsistency is partially raised from the area portion 100 such that a flow path below the vacuum element 23 is again opened.

Figure 5A:
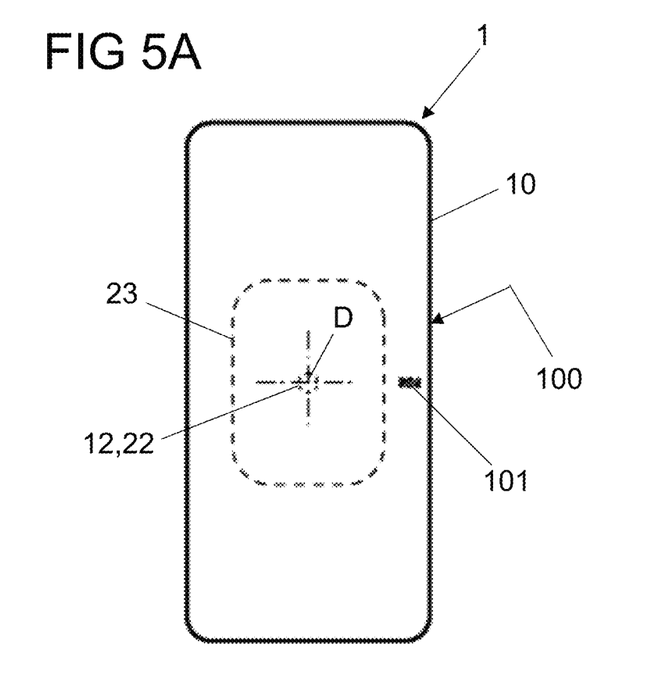
FIG. 5A shows a view of yet another exemplary embodiment of a connecting device in a connected position of two connecting parts.
Figure 5B:
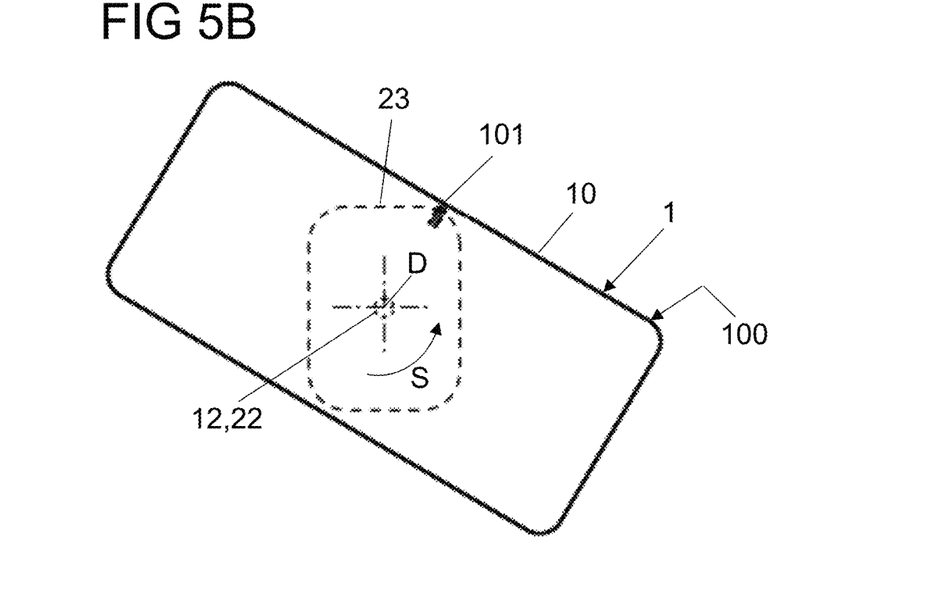
FIG. 5B shows a view of the connecting parts in a position in which the latter are rotated relative to one another.

The exemplary embodiment according to FIGS. 5A, 5B in terms of function corresponds to the exemplary embodiment according to FIGS. 4A, 4B, in that an inconsistency 101 in the form of a depression or an elevation is shaped on the area portion 100, said inconsistency 101 interacting with the vacuum element 23 when the connecting parts 10, 20 are rotated. In the exemplary embodiment according to FIGS. 5A, 5B, the vacuum element 23 here, as opposed to the exemplary embodiment according to FIGS. 4A, 4B, is not shaped so as to be circular but has a rectangular basic shape. However, in a manner entirely analogous to that of the exemplary embodiment according to FIGS. 4A, 4B, the vacuum element 23 by way of a peripheral portion comes to interact with the inconsistency 101 when the connecting parts 10, 20 are mutually rotated, such that a flow path below the vacuum element 23 is opened and a vacuum effect is thus canceled.

In all of the above exemplary embodiments described by means of FIGS. 2A, 2B to 5A, 5B, the vacuum effect between the connecting parts 10, 20 is canceled by rotating the connecting parts 10, 20, wherein a magnetic effect between magnetic elements of the connecting parts 10, 20 (which are not illustrated for improved clarity in FIGS. 3A, 3B to 5A, 5B) is moreover weakened, as is described in the context of the exemplary embodiment according to FIGS. 2A, 2B.

In all of the exemplary embodiments described above the connecting device can be of a simple construction while using fewer components. This results in a cost-effective production. Moreover, the connecting device can be constructed in a space-saving manner, in particular along the fitting direction A, such that the connecting device, in particular in the connected position of the connecting parts 10, 20, does not significantly contribute toward the required axial installation space.

In the exemplary embodiment illustrated in FIGS. 2A, 2B, a locking installation 3 which serves for locking the connecting parts 10, 20 in the connected position according to FIG. 2A and mutually blocks the connecting parts 10, 20 in the connected position such that the connecting parts 10, 20 cannot be readily mutually rotated, in any case not without overcoming the locking mechanism, is schematically plotted.

Figure 6:
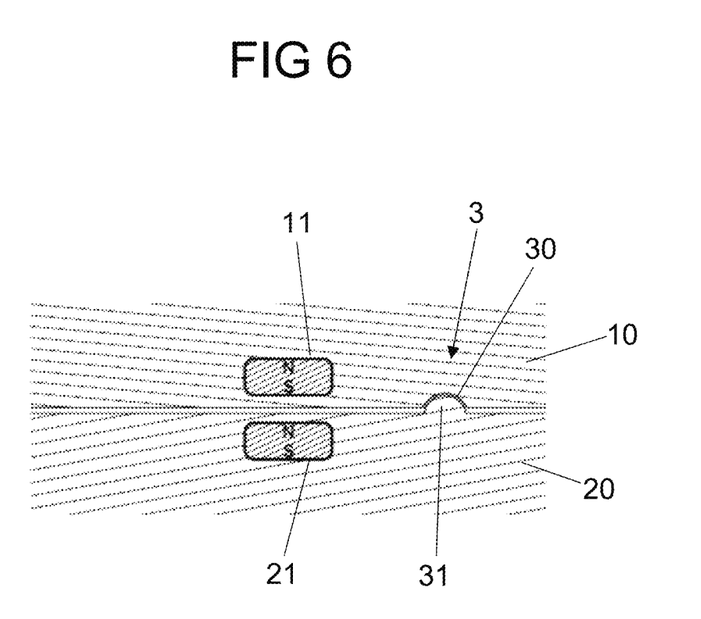
FIG. 6 shows a view of an exemplary embodiment of a locking installation for locking the connecting parts in the connected position.

An exemplary embodiment of such a locking installation 3 is illustrated in FIG. 6. The locking installation 3 here is implemented by locking elements 30, 31, specifically a locking element 31 in the form of a locking stud on the connecting part 20, said locking stud in a locked position engaging in a locking manner with a locking element 30 in the form of a locking opening on the connecting part 10.

The engagement here is designed such that the locking mechanism can be canceled by a sufficient effect of force between the connecting parts 10, 20. To this end, the locking element 31 is shaped as a radiused stud such that the blocking element 31, given a sufficient effect of force, can slide out of the locking opening 30 and thus can be brought to disengage from the assigned locking opening 30.

In an alternative design embodiment, the locking installation 3 can also be designed in such a manner that the locking installation 3 is to be activated in order for the locking mechanism to be released. For example, the locking installation 3 can have a locking pin which for releasing the locking mechanism has to be brought to disengage from an assigned locking opening so as to enable a rotation of the connecting parts 10, 20.

The concept on which the solution is based is not limited to the exemplary embodiments outlined above, but can in principle also be implemented in an entirely different manner.

In particular, entirely different elements which interact for providing vacuum forces are conceivable and possible. To this extent, the embodiments outlined above are to be understood as being merely exemplary A connecting device of the type described here can serve for fastening entirely different functional groups to one another. In particular, the connecting device in terms of the use thereof is not limited to the examples shown here. The connecting device can be advantageously used for fastening electronic apparatuses, for example a camera or a mobile phone. This is however not limiting.

For example, the connecting device can also be used as a closure, for example for a belt strap.

LIST OF REFERENCE SIGNS

1 Functional group (electronic apparatus)
10 Connecting part (mobile phone case)
100 Area portion
101 Inconsistency (flow opening)
11 Magnetic element
12 Bearing installation (bearing journal)
2 Functional group (mounting)
20 Connecting part
200 Member
21 Magnetic element
22 Bearing installation (bearing journal)
23 Vacuum element
230, 231 Portion
3 Locking installation
30, 31 Locking elements
A Fitting direction
D Rotation axis
S Pivoting direction

The invention claimed is:

1. A connecting device for releasably connecting two functional groups, comprising
a first connecting part which is assigned to a first of the functional groups and configures an area portion; and
a second connecting part which is assigned to a second of the functional groups and has a vacuum element which along a fitting direction is connectable to the area portion of the first connecting part and in a connected position bears on the area portion and, in a load state, is held on the area portion by an effect of a vacuum,
wherein the first connecting part in the connected position is mounted in relation to the second connecting part so as to be movable along a plane perpendicular to the fitting direction, wherein, by moving the first connecting part relative to the second connecting part, the position of the vacuum element relative to the area portion is variable and, as a result thereof, the vacuum effect is able to be canceled in order for the first connecting part and the second connecting part to be released from one another, and wherein the vacuum element is configured by a cup element which is elastic.

2. The connecting device according to claim 1, wherein the vacuum element is configured in such a manner that, when moving the first connecting part relative to the second connecting part, the vacuum element by way of at least one portion is sheared off from the area portion.

3. The connecting device according to claim 1, wherein the area portion has an inconsistency wherein, when moving the first connecting part relative to the second connecting part, the vacuum element can be brought to interact with the inconsistency on the area portion and, as a result thereof, the vacuum effect is able to be canceled.

4. The connecting device according to claim 3, wherein the inconsistency is molded as a depression on the area portion.

5. The connecting device according to claim 1, wherein the first connecting part in the connected position is mounted so as to be rotatable in relation to the second connecting part about a rotation axis that is aligned along the fitting direction.

6. The connecting device according to claim 5, wherein one of the connecting parts has a bearing journal and the other of the connecting parts has a bearing opening for rotatably mounting the bearing journal.

7. The connecting device according to claim 5, wherein the vacuum element is configured so as not to be rotationally symmetrical in terms of the rotation axis.

8. The connecting device according to claim 5, wherein the vacuum element is disposed so as to be eccentric in relation to the rotation axis.

9. The connecting device according to claim 1, wherein the first connecting part has at least one first magnetic element, and the second connecting part has at least one second magnetic element, wherein the at least one first magnetic element and the at least one second magnetic element in the connected position interact in a magnetically attractive manner.

10. The connecting device according to claim 9, wherein when moving the first connecting part and the second connecting part relative to one another for releasing the first connecting part and the second connecting part from one another, the at least one first magnetic element and the at least one second magnetic element are adjusted relative to one another and, as a result thereof, a magnetic pull between the at least one first magnetic element and the at least one second magnetic element is weakened.

11. The connecting device according to claim 9, wherein the first connecting part has a plurality of first magnetic elements which are distributed along the plane perpendicular to the fitting direction.

12. The connecting device according to claim 11, wherein the second connecting part has a plurality of second magnetic elements which are in each case assigned to one of the first magnetic elements.

13. The connecting device according to claim 9, wherein the at least one first magnetic element and/or the at least one second magnetic element, when viewed along the plane perpendicular to the fitting direction, are disposed outside the vacuum element.

14. The connecting device according to claim 9, wherein the at least one first magnetic element and/or the at least one second magnetic element are/is formed by an annular permanent magnet.

15. The connecting device according to claim 1, further comprising a locking installation for locking the tangential movement of the first connecting part and of the second connecting part relative to one another along the plane directed perpendicular to the fitting direction.

16. The connecting device according to claim 15, wherein the locking installation is activatable for moving the first connecting part and the second connecting part relative to one another along the plane perpendicular to the fitting direction so as to release the first connecting part and the second connecting part from one another.

17. An electronic apparatus having a connecting device for releasably connecting two functional groups, comprising
a first connecting part which is assigned to a first of the functional groups and configures an area portion; and
a second connecting part which is assigned to a second of the functional groups and has a vacuum element which along a fitting direction is connectable to the area portion of the first connecting part and in a connected position bears on the area portion and, in a load state, is held on the area portion by an effect of a vacuum,
wherein the first connecting part in the connected position is mounted in relation to the second connecting part so as to be movable along a plane perpendicular to the fitting direction, wherein, by moving the first connecting part relative to the second connecting part, the position of the vacuum element relative to the area portion is variable and, as a result thereof, the vacuum effect is able to be canceled in order for the first connecting part and the second connecting part to be released from one another, and
wherein the vacuum element is configured by a cup element which is elastic.

* * * * *